Inventor
James S. Alspaugh

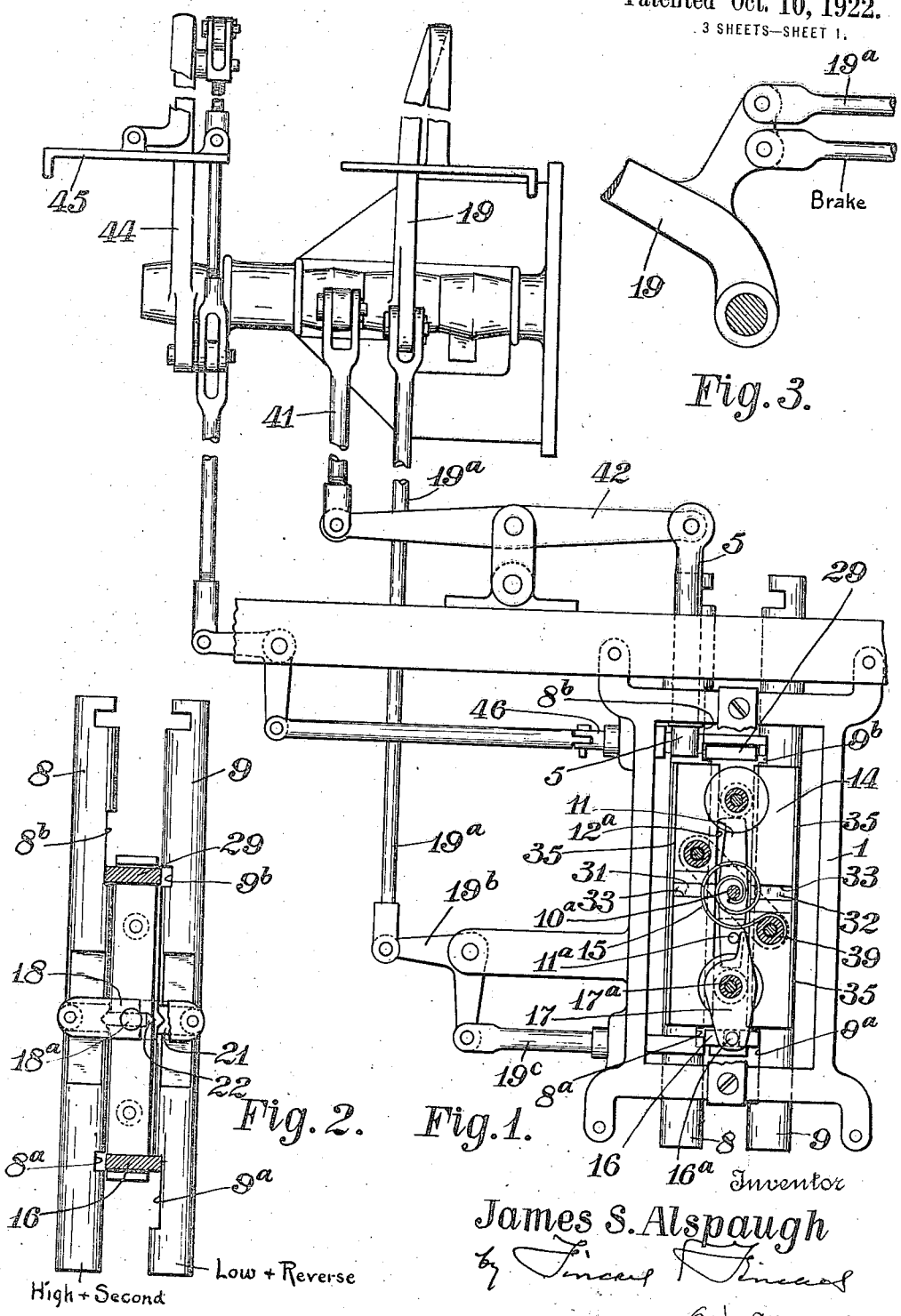

J. S. ALSPAUGH.
GEAR SHIFT MECHANISM.
APPLICATION FILED DEC. 22,
1,431,207.
Patented Oct. 10, 1922.
3 SHEETS—SHEET 3.
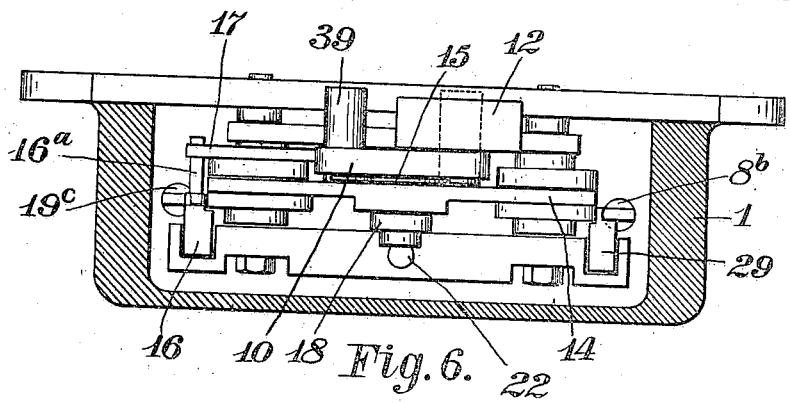
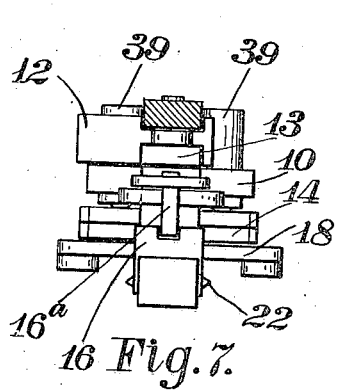
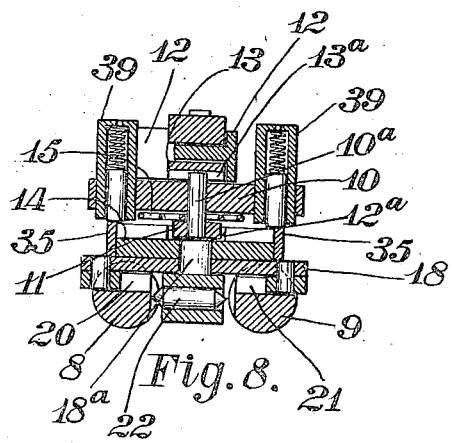
Inventor
James S. Alspaugh
by Fincuel Fincuel
his Attorneys Patented Oct. 10, 1922.

1,431,207

UNITED STATES PATENT OFFICE.

JAMES S. ALSPAUGH, OF PORTSMOUTH, OHIO.

GEAR-SHIFT MECHANISM.

Application filed December 22, 1921. Serial No. 524,117.

*To all whom it may concern:*

Be it known that I, JAMES S. ALSPAUGH, a citizen of the United States, residing at Portsmouth, in the county of Scioto and State of Ohio, have invented a certain new and useful Improvement in Gear-Shift Mechanism, of which the following is a specification.

The present invention relates more particularly to a gear shift mechanism for a motor vehicle, such mechanism being of the sliding type such as used for example, in the "Cadillac" and many other cars. In this sort of mechanism, as well understood, a hand lever is used to shift gears into low, intermediate, high and reverse, such mechanism including two rods, one of which is shifted to obtain low or reverse and the other shifted to obtain intermediate or high. In a United States patent issued to me January 3, 1922, No. 1,402,334, I show and describe a mechanism for dispensing with the use of the hand operated lever in such a mechanism and the present invention is a refinement of that mechanism, the principal object being to provide means for positively locking in the neutral position the gear shift rod that is not to be operated thereby preventing the accidental movement of that rod. In carrying out the invention I use three latches shiftable between the rods, one of said latches being actuated automatically by the movement of one rod with reference to the other, another of said latches being actuated by the pedal of the clutch lever and the third latch actuated by the brake lever. Other objects and features of the invention will appear from the disclosure herein.

The invention is embodied in the example herein shown and described, the features of novelty being finally claimed.

In the accompanying drawings—

Figure 1 is a plan view with parts broken out and omitted and parts in section to illustrate details of construction.

Fig. 2 is a plan view, with parts broken out, of the gear shift rods with the latches and floating rod shifting lever.

Fig. 3 is a detail of a portion of the brake lever and its mounting.

Fig. 6 is a detail side view on a larger scale of the shift mechanism, the rods being omitted.

Fig. 7 is a detail end view of the same.

Fig. 8 is a cross section through the center of the gear shift mechanism.

Figure 4:
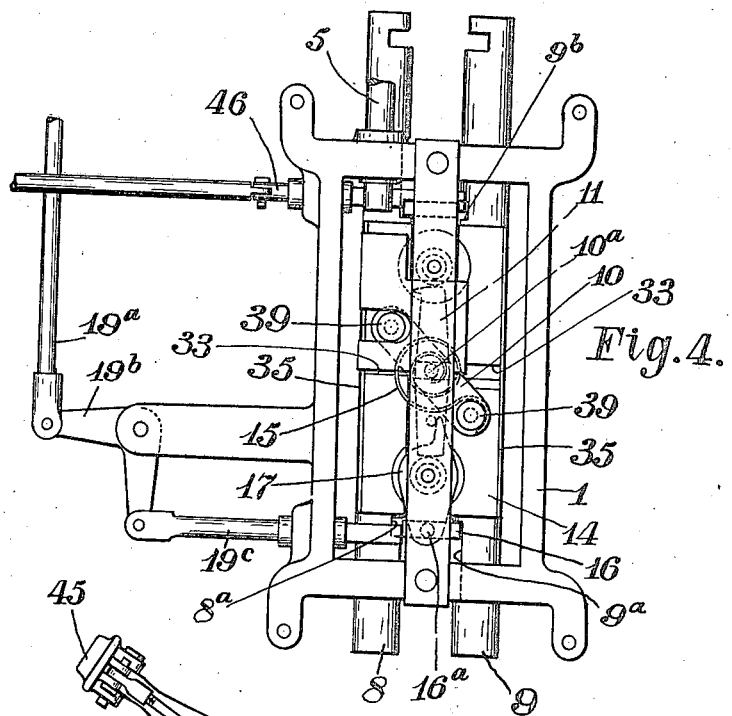
Fig. 4 is a top plan view of the gear shift mechanism.

The gear shifting devices shown include generally the usual rods 8 and 9 mounted in a suitable frame or box 1. The rod 9 actuates the speed changing gear (not shown) to secure low or reverse motion and the rod 8 the intermediate or high. The rods 8 and 9 are provided in their upper faces with transverse grooves 20 and 21 (see Fig. 8) standing opposite each other when in neutral position to receive the opposite ends of a floating lever 18. The rods 8 and 9 are also provided in their adjacent sides with vertical V-shaped grooves—opposite each other in the neutral position of the rods—to be engaged by a slide pin 22 having V-shaped ends to engage one or the other of said V-shaped grooves but not both at the same time. The pin 22 is of such length that when one of the rods is slid to shift a gear said pin 22 is slid lengthwise into engagement with the opposite rod to prevent the latter from movement. Sliding in a suitable frame above the rods 8 and 9 is a plate 14 having in its upper face cross grooves 31 and 32 with their bottoms in line with each other, the opposing wall 33 being vertical to form abutments while the other walls are slanting. The outer ends of said cross grooves are closed by strips 35. The function of the sliding plate 14 is to actuate the floating lever 18, the latter having a central pin 18$^a$ pivotally connecting it with said plate.

Pivoted above the slide 14 is an oscillating member 10 carrying at each of its ends hollow studs 39 containing spring pressed latch pins to enter the grooves 31 and 32 according to the position of the members. The oscillating member 10 is on a pivoting pin 10$^a$ that is secured in its lower end in a bar 11 lying loosely in a longitudinal groove 12$^a$ in the plate 14, said pin extending at its upper end in a cross slot 13$^a$ in a longitudinal frame bar 13. The bar 11 is of less width than groove 12$^a$ so that it shall be capable of some rocking movement in said groove, the forward end of said bar being provided with a toe at one side to bear against the side wall of the groove when the rear end of the bar is rocked. A volute spring 15 encircles the pivoting pin 10ª and has one of its ends anchored in the rocking bar 11 while the other end embraces the right hand hollow stud 39 so as normally to press the oscillating member 10 into substantially the inclined position shown in Fig. 1, to wit: with the latch pins of said member riding on the face of the slide plate 14. The normal tendency of the volute spring 15 is to hold the rear end of the rocking bar 11 to the right.

16 designates a latch for the gear shift rods, said latch being located in the rear portion of the frame and adapted in operation to be slid back and forth between said rods. The rod 8 is provided with a notch 8ª located, when the rod is in neutral position, to receive said latch 16 and be held thereby from movement in either direction; and the rod 9 is provided with a notch 9ª opposite the notch 8ª elongated rearwardly beyond the line of said notch 8ª so as to permit forward movement of the rod 9 notwithstanding the latch 16 may be standing therein. The forward end of the notch 9ª is located to limit the rearward movement of the rod 9 to its neutral position when encountering the latch 16. The latch 16 is of such width that when normally projected into one of said notches it is free from the other. The upper edge of the latch 16 is made with a notch engaged by a pin 16ª on the rear end of a lever 17 pivoted at 17ª in the frame. The forward arm of the lever 17 is constantly pressed by a pin 11ª on the rocking lever 11 with a tendency to shift said latch 16 to the left or toward the notch 8ª or the bar 8, but the latch 16 is normally pressed into the elongated notch 9ª or toward the bar 9 by the superior pressure of the usual spring (not shown) of the usual brake lever 19. For the purpose of utilizing the brake lever and its spring to effect this result there is connected to the brake lever a rod 19ª, a bell-crank 19ᵇ and push rod 19ᶜ, the end of the last being arranged to impinge upon and press the latch 16 in the direction stated. When the pressure of push rod 19ᶜ on the latch 16 is relieved by an ordinary application of the brake the lever 11, actuated by the volute spring, shifts said latch into the notch 8ª (if at the time opposite said latch) and liberates the rod 9 from that latch for movement rearward.

Embracing the left hand hollow stud 39 of the oscillating member 10 is a sliding block 12. This block is arranged to be struck and shoved rearward to oscillate the member 10 by a push rod 5 on one end of a lever 42 actuated by a rod 41 connected with or on the shaft of the clutch lever 44 when that lever is pushed forward to release the clutch. The full operation of the clutch lever therefore oscillates the member 10 to move the plate 14 backward or forward according to the position of said member, the plate 14, the lever 17 as well as the position laterally of the member 10 under the influence of the volute spring. In this connection it should be borne in mind that the member 10 is shifted slightly to the right when the pressure of the push rod 19ᶜ on the latch 16 is removed by application of the brake and that in this event, if the member 10 be oscillated, the latch of the left hand stud 39 will engage the left hand abutment wall 33 of the plate 14 (if that plate is in neutral position) and move said plate rearward. On the other hand if the push rod 19ᶜ is holding the latch 16 to the rod in the elongated notch 9ª and the member 10 is oscillated by actuation of the block 12 (the plate 14 being in normal position) the latch of the right hand lug 39 will engage the right hand abutment 33 and throw the plate 14 forward.

Figure 5:
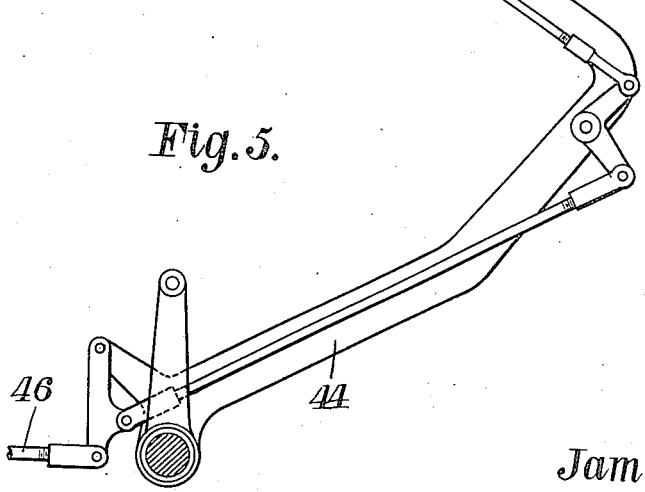
Fig. 5 is a side view of the clutch lever and its appurtenances for operating one of the latches.

29 designates another latch for the gear shift rods, said latch being located in the forward portion of the frame and adapted to be slid back and forth between said rods. The rod 9 is provided with a notch 9ᵇ located, when that rod is in neutral position, to receive said latch 29 to hold said rod from movement in either direction, and the rod 8 is provided with a notch 8ᵇ opposite the notch 9ᵇ elongated forwardly beyond the line of said notch 9ᵇ so as to permit rearward movement of the rod 8 notwithstanding the latch 29 may be standing therein. The rear end of the notch 8ᵇ is located to limit the forward movement of the rod 8 to the latter's neutral position when encountering the latch 29. The latch 29 is of such width that when normally projected into one of said notches it is free from the other. The latch 29 is actuated back and forth by a pivoted foot piece 45 communicating by a suitable system of rods and levers clearly shown in Figs. 1 and 5 with a rod 46 connected with said latch 29. This latch 29 can be shifted into and out of the notch 9ᵇ at will by merely tilting the foot on the clutch pedal and the clutch lever may be pressed out to release the clutch with the latch 29 engaged or not engaged with said notch 9ᵇ. The notches 8ª and 9ª may be denominated neutral notches.

It may be noted that when the latch 16 or latch 29 is moved into its neutral notch the rod containing that notch is precluded from movement by the opposite rod until the elongated notch of such opposite rod comes into position to permit removal of the locking latch. It should also be noted that the intermediate pin 22 prevents the shifting of both rods together when both would be otherwise in shiftable position, as for example, when both the elongated notches stand in symmetrical arrangement with the neutral notches.

The operation can be best understood by a study of Fig. 2. In that view the two gear shifting rods are shown as in normal or non-running position. From this position the car can be started by movement of the rod 9 forward by a complete forward stroke of the clutch pedal thereby carrying the plate 14 to forward position by the right hand latch of the oscillating member 10. To go from the low into second or intermediate gear another forward stroke of the clutch pedal restores the rod 9 to neutral position where it is arrested and carries the rod 8 to second or intermediate position the intermediate latch being thrown over to rod 9. To go from second gear into high a full forward stroke of the clutch (with the forward latch 29 thrown to engage rod 9) caused rod 8 to make a full stroke forward the rod 9 being held from movement by all three latches. To restore rod 8 to neutral position another forward stroke of the clutch is necessary thereby moving the plate 14 and said rod 8 rearward. To stop the rearward movement of the rod 8 in neutral position pressure is applied to the brake pedal simultaneously with the last described stroke of the clutch lever so that the rear latch 16 shall spring into the neutral notch 8$^a$ of the rod 8. If it be desired to go from high into second the pressure last described must not be applied so that the rod 8 shall be free to pass to second speed position. To go from neutral to reverse or from low to reverse it is necessary to apply the brake thereby permitting the release of the rear latch 16 into the neutral notch 8$^a$ of the rod 8 and the shifting to the right of the oscillating member 10 into position to actuate the plate 14 in the rearward direction by the engagement of the left hand latch pin of said member 10 with left hand abutment 33. It is obvious that the operator can go directly from neutral into second by pushing out both the brake and clutch levers to hook the left hand latch of the oscillating member 10 with the corresponding abutment wall 33 of the plate 14, then releasing the brake to release the rear latch 16 from the neutral notch 8$^a$ and finally shifting rod 8 rearward by completing the outward movement of the clutch lever.

The forms of the parts can be changed without departing from the gist of the invention as claimed.

What I claim is:

1. The combination with a clutch member and two gear shifting rods, of three latches for the rods each shiftable between them out of latching engagement with one rod into latching engagement with the other, one of said latches being automatically so shiftable by the operation of one of the rods, means connected with the clutch operating member for so shifting another of said latches and means operative at will for operating the third latch, substantially as described.

2. The combination with clutch and brake operating members and two gear shifting rods, of three latches for the rods each shiftable between them out of latching engagement with one rod into the other, one of said latches being automatically so shiftable by the operation of one of the rods, means connected with the clutch operating member for so shifting another of said latches and means actuated by the brake member for causing the actuation of the third latch.

3. In a gear shifting mechanism of the kind described, in combination, a brake operating member and two gear shifting rods, a latch shiftable between said rods to lock one of them and be released from the other, means for shifting the released rod including a reciprocated member and an oscillating member to selectively engage said reciprocated member, a spring actuating said oscillated member to shift the axis of motion thereof in one direction and means actuated by the brake operating member for shifting said axis of motion in the opposite direction.

4. In a gear shifting mechanism of the kind described, in combination, a brake operating member and two gear shifting rods, a latch shiftable between said rods to lock one of them and be released from the other, means for shifting the released rod including a reciprocated member and an oscillated member to selectively engage said reciprocated member, a spring actuating said latch and said oscillated member to shift the axis of motion thereof in one direction and means actuated by the brake for causing the shifting of said latch and for shifting said axis of motion in the opposite direction, substantially as described.

5. In a gear shifting mechanism of the kind described, in combination, a brake operating member and two gear shifting rods, a latch shiftable between said rods to lock one of them and be released from the other, means for shifting the released rod including a reciprocated member and an oscillating member to selectively engage said reciprocated member, a spring actuating said latch and said oscillated member to shift the axis of motion of the latter in one direction and means actuated by the brake operating member for shifting said latch and the said axis of motion in the opposite direction, substantially as described.

6. In a motor vehicle having a gear shift mechanism of the kind described and a brake operating device, the combination of two gear shift rods and a shiftable latch for releasing either rod and locking the other, selective means for operating the released rod including a laterally shiftable oscillating member, a spring common to the said oscillating member and the latch for holding them in one position, and means operated by the brake operating device to cause the release of said oscillating member and latch from said position.

JAMES S. ALSPAUGH.